United States Patent
Zhang (10) Patent No.: US 11,234,081 B2
(45) Date of Patent: Jan. 25, 2022

(54) VIBRATION MODULE, ELECTRONIC DEVICE, AND METHOD OF CONTROLLING ELECTRONIC DEVICE

(71) Applicant: BEIJING XIAOMI MOBILE SOFTWARE CO., LTD., Beijing (CN)

(72) Inventor: Yapei Zhang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/744,442

(22) Filed: Jan. 16, 2020

(65) Prior Publication Data
US 2021/0099808 A1 Apr. 1, 2021

(30) Foreign Application Priority Data
Sep. 27, 2019 (CN) .......................... 201910922829.X (51) Int. Cl.
*H04R 17/00* (2006.01)
*G06F 3/01* (2006.01)
(Continued)

(52) U.S. Cl.
CPC ............. *H04R 17/00* (2013.01); *G06F 3/016* (2013.01); *H04M 1/026* (2013.01); *H04R 1/025* (2013.01);
(Continued)

(58) Field of Classification Search
CPC .......... H04R 17/00; H04R 1/025; H04R 3/00; H04R 2307/023; H04R 2400/03;
(Continued)

(56) References Cited

U.S. PATENT DOCUMENTS

2006/0113932 A1* 6/2006 Mori ..................... H04R 19/02
318/114
2013/0044065 A1 2/2013 Lee
(Continued)

FOREIGN PATENT DOCUMENTS

CN 107566965 A 1/2018
CN 107979671 A 5/2018
(Continued)

OTHER PUBLICATIONS

European Search Report in the European application No. 20151606.9, dated May 29, 2020.

*Primary Examiner* — Nivian C Chin
*Assistant Examiner* — Con P Tran
(74) *Attorney, Agent, or Firm* — Syncoda LLC; Feng Ma (57) ABSTRACT

A vibration module is assembled inside a device body of the electronic device and includes: a driving motor and a packaging structure arranged outside the driving motor. The driving motor can cooperate with a sounding part of the packaging structure when in a first vibration mode, and drive the sounding part to generate a vibrating sound wave; and the driving motor can cooperate with at least one function module of the device body when in a second vibrating mode, and drive the function module to vibrate, thereby simplifying the structure of the vibration module, reducing the occupied inner space of the electronic device by the vibration module, and reducing the cost of the electronic device.

18 Claims, 4 Drawing Sheets

(51) Int. Cl.
*H04M 1/02* (2006.01)
*H04R 3/00* (2006.01)
*H04R 1/02* (2006.01)

(52) U.S. Cl.
CPC ......... *H04R 3/00* (2013.01); *H04R 2307/023* (2013.01); *H04R 2400/03* (2013.01); *H04R 2499/11* (2013.01); *H04R 2499/15* (2013.01)

(58) Field of Classification Search
CPC . H04R 2499/11; H04R 2499/15; G06F 3/016; H04M 1/026
USPC ........... 381/333, 98, 162, 190, 150; 340/7.6, 340/7.62, 384.1
See application file for complete search history.

(56) References Cited

U.S. PATENT DOCUMENTS

| | | | |
|---|---|---|---|
| 2014/0301596 A1* | 10/2014 | Wang | H04R 1/028 381/388 |
| 2015/0063595 A1 | 3/2015 | Kemppinen et al. | |
| 2016/0014921 A1* | 1/2016 | Francois | H04N 7/141 361/807 |
| 2016/0254843 A1* | 9/2016 | Terlizzi | H04W 12/06 455/41.2 |
| 2019/0261092 A1 | 8/2019 | Landick | |

FOREIGN PATENT DOCUMENTS

| | | |
|---|---|---|
| EP | 2560352 A1 | 2/2013 |
| GB | 2517721 A | 3/2015 |

\* cited by examiner

VIBRATION MODULE, ELECTRONIC DEVICE, AND METHOD OF CONTROLLING ELECTRONIC DEVICE

CROSS-REFERENCE TO RELATED APPLICATION

The present application claims priority to Chinese Patent Application No. 201910922829.X filed on Sep. 27, 2019, the disclosure of which is hereby incorporated by reference in its entirety.

SUMMARY

The present disclosure relates to the field of electronic technologies, and more particularly, to a vibration module, an electronic device, and a method of controlling an electronic device.

According to a first aspect of the present disclosure, a vibration module is provided, which is assembled inside a device body of the electronic device and may include: a driving motor and a packaging structure arranged outside the driving motor.

The driving motor may be configured to be electrically connected with a control chip of the electronic device and controlled to be in a first vibration mode or a second vibration mode.

The packaging structure may include a sounding part. The driving motor is configured to, in a case that the driving motor is in the first vibration mode cooperate with the sounding part and drive the sounding part to generate a vibrating sound wave, and in a case that the driving motor is in the second vibration mode, cooperate with at least one function module of the device body and drive the at least one function module to vibrate.

According to a second aspect of the present disclosure, an electronic device is provided, which may include: a device body, a control chip assembled inside the device body, and the above vibration module.

The control chip may be configured to be electrically connected with the driving motor to send a sounding control signal or an interaction control signal to the driving motor. The driving motor may be configured to: upon receiving the sounding control signal, activate the first vibration mode; and upon receiving the interaction control signal, activate the second vibration mode.

According to a third aspect of the present disclosure, a method of controlling an electronic device is provided. The electronic device includes a driving motor. The method may include that:

a control signal is received;

in case that the control signal is a sounding control signal, the driving motor is controlled to enter a first vibration mode, so as to enable the driving motor to drive a sounding part of the electronic device to generate a vibrating sound wave;

in case that the control signal is an interaction control signal, the driving motor is controlled to enter a second vibration mode, so as to enable the driving motor to drive a function module of the electronic device to vibrate.

According to a fourth aspect of the present disclosure, a computer-readable storage medium is provided, which has computer instructions stored thereon. The instructions, when executed by a processor, can enable the processor to implement the steps of the method of controlling an electronic device.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with embodiments of the present disclosure. Instead, they are merely examples of apparatuses and methods consistent with aspects of the embodiments of the present disclosure as recited in the appended claims.

Terms used in the present disclosure are only adopted for the purpose of describing specific embodiments and not intended to limit the present disclosure. "A/an" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first," "second," "third" and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, term "if" used here may be explained as "while" or "when" or "responsive to determining," which depends on the context.

Electronic devices like a mobile phone typically have a vibration touch function of a function module and a play function. A sound wave spread by the play function is often generated by a sound vibrating motor and broadcast from a receiver set on a screen. Vibration touch of the vibration touch function is usually implemented by an interaction vibrating motor. However, arranging both the sound vibrating motor and the interaction vibrating motor for the electronic device may increase not only the occupied inner space of the electronic device, but also the overall cost of the electronic device.

It is to be noted that the electronic device involved in the present disclosure may be a mobile phone, a tablet PC, on-board equipment, a medical terminal, etc., which is not limited by the present disclosure.

Figure 1:
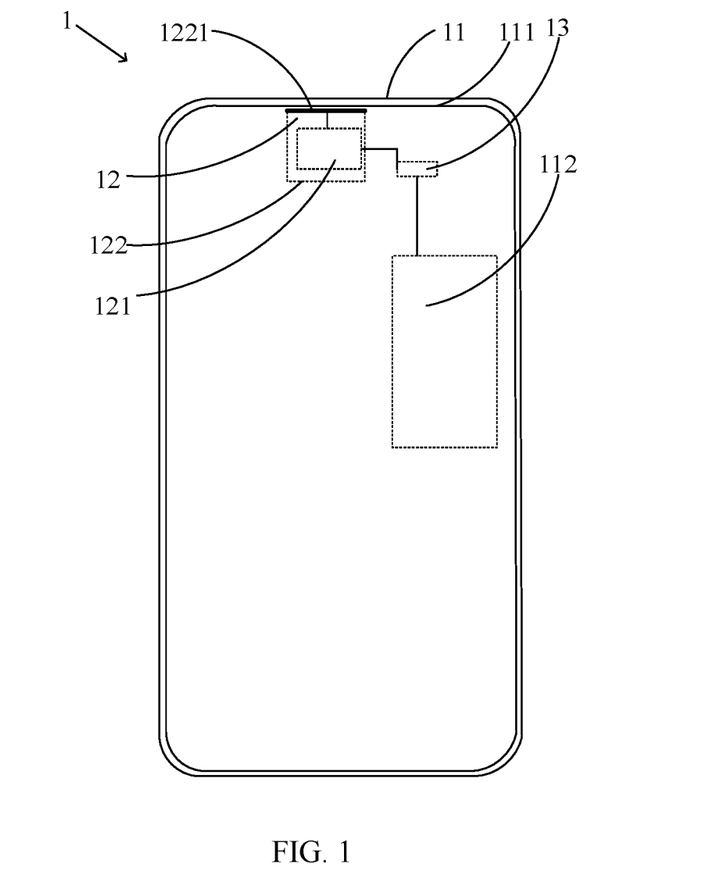
FIG. 1 is a structure diagram of an electronic device according to some embodiments.

FIG. 1 is a structure diagram of an electronic device according to some embodiments. As shown in FIG. 1, the electronic device 1 may include: a device body 11, and a control chip 13 and a vibration module 12 which are assembled inside the device body 11.

The vibration module 12 may include: a driving motor 121 and a packaging structure 122 arranged outside the driving motor 121. The driving motor 121 can be electrically connected with the control chip 13 of the electronic device 1 and can be controlled to be in a first vibration mode or a second vibration mode. The packaging structure 122 may include a sounding part 1221. In a case that the driving motor 121 is in the first vibration mode, the driving motor 121 can cooperate with the sounding part 1221 and drive the sounding part 1221 to generate a vibrating sound wave. In a case that the driving motor is in the second vibration mode, the driving motor 121 can cooperate with the function module 111 of the device body 11 and drive the function module 111 to vibrate.

A control mainboard 112 of the device body 11 can be electrically connected with the control chip 13, to send a sounding control instruction or an interaction vibration control instruction to the control chip 13. After receiving the sounding control instruction or the interaction vibration control instruction, the control chip 13 can be electrically connected with the driving motor 121 and send a sounding control signal or an interaction control signal to the driving motor 121 in the form of a voltage and/or current signal. Upon receiving the sounding control signal, the driving motor 121 can activate the first vibration mode; and upon receiving the interaction control signal, the driving motor 121 can activate the second vibration mode.

A voltage exchange frequency and/or a current of the interaction control signal and that of the sounding control signal can be controlled so as to control the vibration mode of the driving motor 121.

In some embodiments, the voltage exchange frequency of the interaction control signal can be made greater than the voltage exchange frequency of the sounding control signal. For example, upon that a vibration prompt is needed when a phone call is coming, a first voltage exchange frequency may be provided through the control chip 13, and the driving motor 121 may activate the first vibration mode and drive the function module 111 of the device body 11 to vibrate. Upon that the phone call is picked up, a second voltage exchange frequency less than the first voltage exchange frequency may be provided through the control chip 13, and the driving motor 121 may activate the second vibration mode and drive the sounding part 1221 of the packaging structure to vibrate to generate a sound wave, so that a user can hear the conversation.

In another embodiment, the current of the interaction control signal can be made greater than the current of the sounding control signal. For example, upon that the vibration prompt is needed when a phone call is coming, a first current, the magnitude of which can break a structural status of the sounding part 1221 to avoid generation of sound, may be provided through the control chip 13, and the driving motor 121 may activate the first vibration mode and only drive the function module 111 of the device body 11 to vibrate. After the phone call is picked up, a second current less than the first current may be provided through the control chip 13, and the driving motor 121 may activate the second vibration mode and drive the sounding part 1221 of the packaging structure to vibrate to generate a sound wave, so that the user can hear the conversation.

By arranging the driving motor 121 and the packaging structure 122 for the vibration module 12, the driving motor 121 can cooperate with the sounding part 1221 of the packaging structure 122 in case that the driving motor 121 is in the first vibration mode, and can drive the sounding part 1221 to generate a vibrating sound wave; and the driving motor 121 can cooperate with the function module 111 of the electronic device 1 in case that the driving motor 121 is in the second vibrating mode, and can drive the function module 111 to vibrate. By the cooperation between the driving motor 121 in the first vibration mode and the sounding part 1221, and the cooperation between the driving motor 121 in the second vibration mode and the function module 111, the above structure configuration can realizes two functions including sounding and interaction vibration, thereby simplifying the structure of the vibration module 12, reducing the occupancy of inner space of the electronic device 1 by the vibration module 12, and reducing the cost of the electronic device 1.

It is to be noted that the function module 111 of the device body 11 can be one of a screen, a function key, or a casing. For example, in a case that the function module 111 is the screen, the driving motor 121 can drive, in the second vibration mode, the screen to vibrate when cooperating with the screen of the device body 11, so as to form a vibration touch effect of the screen. Similarly, when cooperating with the function key or the casing of the device body 11, the driving motor 121 can also drive, in the second vibration mode, the function key or the casing to generate the corresponding vibration effect. Furthermore, the function module 111 of the device body 11 may also be the whole of the device body 11, and the driving motor 121 may cooperate with the whole of the device body 11 to drive the whole device body 11 to vibrate, so as to bring a vibration effect.

In the above embodiments, the vibration module 12 may cooperate with the casing of the device body 11 directly. Taking that the vibration module 12 cooperates with a middle frame of the device body 11 for example, the middle frame can be driven to sound through the driving motor 121 and the sounding part 1221 in the form of clicking with subtle vibration, and then the sound can be transmitted through the middle frame. The above structure configuration can have a good sound transmission effect, and can avoid a sound hole from being opened additionally on the screen, thereby improving a screen-to-body ratio and improving a waterproof and dustproof performance of the electronic device 1.

Taking that the driving motor 121 is a linear motor for example, the structure and the vibration mode of the vibration module 12 are illustrated below.

The driving motor 121 in the first vibration mode may adopt a first vibration parameter; the driving motor 121 in the second vibration mode may adopt a second vibration parameter. The first vibration parameter may be different from the second vibration parameter. The vibration parameters may be related to a vibration frequency, an amplitude of vibration, and a vibration direction, which are not limited by the present disclosure.

In some embodiments, the situation that the first vibration parameter and the second vibration parameter are related to a vibration frequency is taken as an example. Since interaction vibration and sound vibration need different vibration frequencies of the driving motor 121, the linear motor can be controlled accurately based on a vibration frequency range, and the linear motor can be enabled to generate different amplitudes of frequency by controlling the change of direction and amplitude of the current or voltage through the control chip 13. When sound is needed, the linear motor can be controlled to provide a subtle frequency vibration to drive the sounding part 1221 of the packaging structure 122 to vibrate so as to generate a vibrating sound wave. When interaction vibration is needed, the direction and amplitude of the current or voltage can be adjusted through the control chip 13, a sounding status of the sounding part 1221 of the packaging structure 122 can be broken, so that generation of a sound wave can be avoided, and only the vibration acting on the function module 111 can be formed.

For example, in a case that the electronic device 1 is a mobile phone and there is a coming call, the driving motor 121 may adopt the first vibration parameter to vibrate, and after the call is picked up, the driving motor 121 may adopt the second vibration parameter to vibrate. The vibration frequency generated when the mobile phone receives a call may be greater than the vibration frequency generated when the mobile phone keeps the call. When the mobile phone has a coming call, the vibration frequency of the whole device can be increased, and the mobile phone can vibrate; after the call is picked up, the vibration frequency can be reduced to just keep the conversation, and the mobile phone may stop vibrating.

In another embodiment, the situation that the first vibration parameter and the second vibration parameter are related to the amplitude of vibration is taken as an example. The amplitude of vibration of the mobile phone when the conversation is kept may be greater than the amplitude of vibration when a call is coming. Specifically, in a case that it is needed to increase the volume of conversation, the driving motor 121 may increase the amplitude of vibration; the amplitude of vibration increases, the decibel of the sound wave increases too; on the contrary, the driving motor 121 may decrease the amplitude of vibration, the decibel of the sound wave may decrease too.

In yet another embodiment, the situation that the first vibration parameter and the second vibration parameter are related to the vibration direction is taken as an example. The vibration direction of the driving motor 121 in the first vibration mode may be different from the vibration direction of the driving motor 121 in the second vibration mode. By adopting a linear motor which has a vibration direction that can be controlled accurately, when sound is needed, the control chip 13 can control the linear motor through the voltage to provide an amplitude of vibration and a vibration direction needed by a sound frequency, so as to drive the sounding part 1221 to vibrate to generate a corresponding sound wave; and when the interaction vibration is needed, the direction of the current or the voltage can be controlled through the control chip 13, so as to prevent, through the change of the vibration direction of the linear motor, the vibration from being transmitted to the sounding part 1221 of the packaging structure 122, thereby avoiding generation of a sound wave, and only generating an interaction vibration acting on the function module 111.

Figure 2:
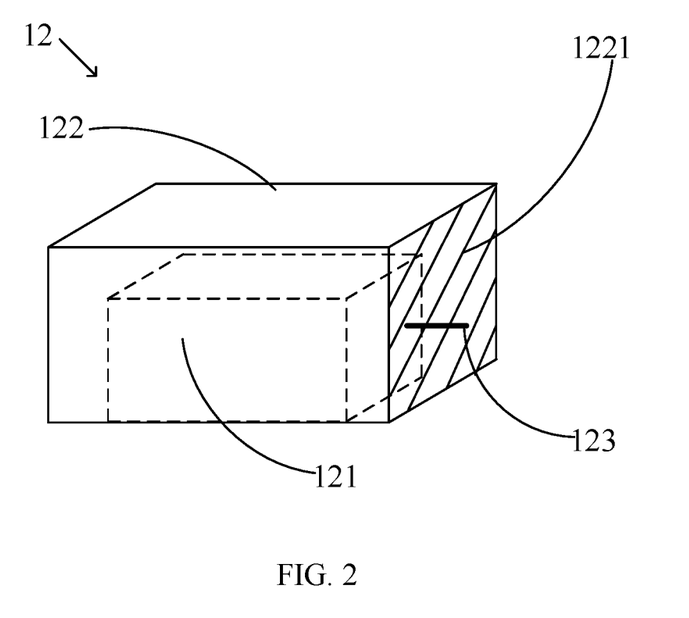
FIG. 2 is a structure diagram of a vibrating component according to some embodiments.

Furthermore, as shown in FIG. 2, the vibration module 12 may further include a driving medium 123. The driving medium 123 can be connected with the driving motor 121 and the sounding part 1221 respectively. The driving medium 123 can assist in establishing a connection between the driving motor 121 and the sounding part 1221, so it is helpful to improve the position flexibility of the driving motor 121. The driving medium 123 may be either a linkage mechanism or a piezoceramics structure, which is not limited by the present disclosure.

It is to be noted that the sounding part 1221 may form a partial structure of the packaging structure 122. On one hand, a cooperation between the driving motor 121 in the first vibration mode and the sounding part 1221 can be ensured; on the other hand, in a case that the driving motor 121 is in the second vibration mode, the partial sounding part 1221 at the packaging structure 111 can reduce the interference caused by transmitting the vibration generated by the driving motor 121 to the function module 111, thereby facilitating the vibration control over the function module 111. The material of the sounding part 1221 may be ceramic. The ceramic has a good effect of generating a sound wave based on vibration, so that the sound effect of the vibration module 12 can be improved.

Figure 3:
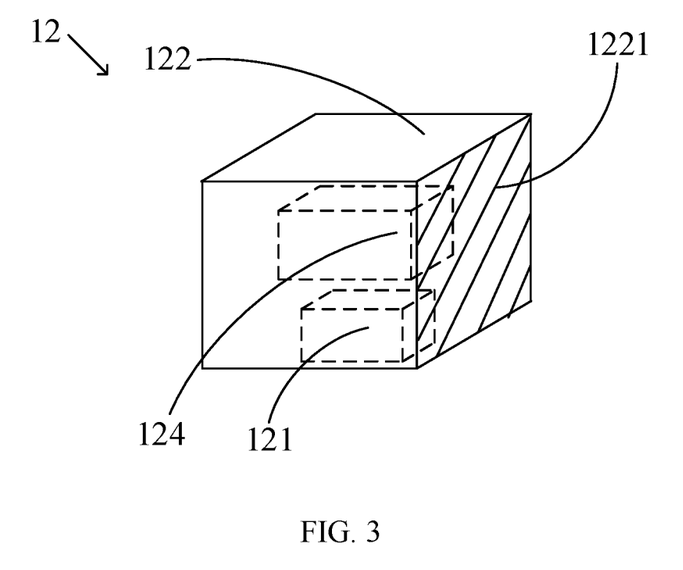
FIG. 3 is a structure diagram of a vibrating component, according to another exemplary embodiment.

In other embodiments, as shown in FIG. 3, the driving motor 121 may be a linear motor, the vibration module 12 may include the linear motor and a piezoceramics 124. The piezoceramics 124 can be electrically connected with the control chip 13, and cooperate with the sounding part 1221 to drive under control the sounding part 1221 to generate a vibrating sound wave. The piezoceramics 124 and the linear motor can be integrally packaged by the packaging structure 122. The piezoceramics 124 can cooperate with the sounding part 1221 of the packaging structure 122, and the linear motor can cooperate with the function module 111. When sound is needed, a corresponding electrical signal can be provided through the control chip 13, so that the piezoceramics 124 can knock the sounding part 1221 of the packaging structure 122 to generate a sound wave. When the interaction vibration is needed, a corresponding electrical signal can be provided to the linear motor through the control chip 13, so that the linear motor can drive the function module 111 to vibrate.

By arranging the driving motor 121 and the packaging structure 122 for the vibration module 12, the driving motor 121 in the first vibration mode can cooperate with the sounding part 1221 of the packaging structure 122, and can drive the sounding part 1221 to generate a vibrating sound wave; and the driving motor 121 in the second vibrating mode can cooperate with the function module 111 of the electronic device 1, and can drive the function module 111 to vibrate. By means of the cooperation between the driving motor 121 in the first vibration mode and the sounding part 1221, and the cooperation between the driving motor 121 in the second vibration mode and the function module 111, the above structure configuration can realize two functions including sounding and interaction vibration, thereby simplifying the structure of the vibration module 12, reducing the occupancy of inner space of the electronic device 1 by the vibration module 12, and reducing the cost of the electronic device 1.

The present disclosure further provides a method of controlling an electronic device. The electronic device may include the driving motor. The method may include that: a control signal is received; in a case that the control signal is the sounding control signal, the driving motor is controlled to enter the first vibration mode, so as to enable the driving motor to drive the sounding part of the electronic device to generate a vibrating sound wave; in a case that the control signal is the interaction control signal, the driving motor is controlled to enter the second vibration mode, so as to enable the driving motor to drive the function module of the electronic device to vibrate.

Figure 4:
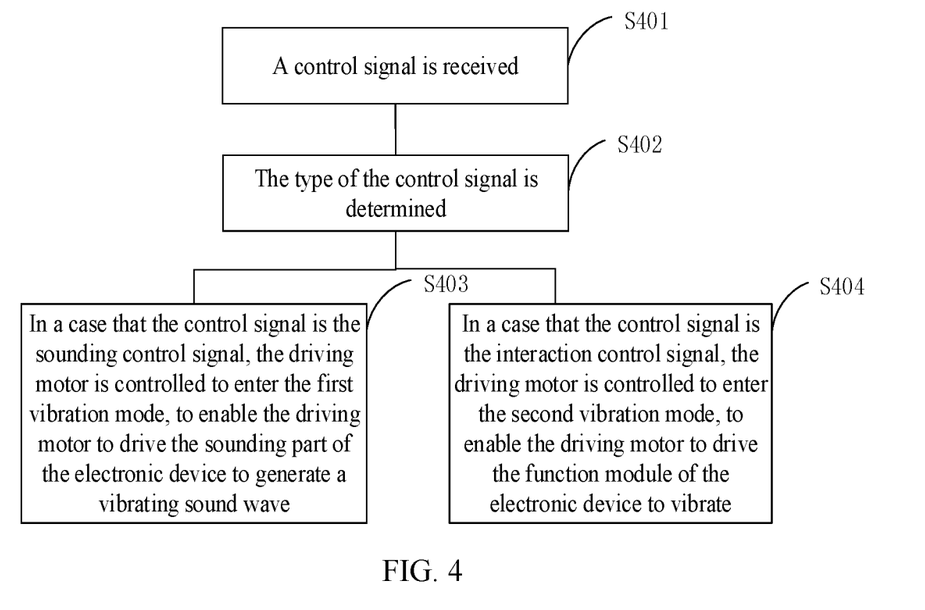
FIG. 4 is a flow chart showing a method of controlling an electronic device according to some embodiments.

FIG. 4 is a flow chart showing a method of controlling an electronic device according to some embodiments. As shown in FIG. 4, the control method may be implemented through the following steps.

In step 401, a control signal is received.

In step 402, the type of the control signal is determined.

In step 403, in a case that the control signal is the sounding control signal, the driving motor is controlled to enter the first vibration mode, to enable the driving motor to drive the sounding part of the electronic device to generate a vibrating sound wave.

In step 404, in a case that the control signal is the interaction control signal, the driving motor is controlled to enter the second vibration mode, to enable the driving motor to drive the function module of the electronic device to vibrate.

In the above embodiments, sounding control and vibration control of the electronic device can be realized by arranging only one motor, thereby not only decreasing the occupied inner space of the electronic device, but also reducing the overall cost of the electronic device.

It is to be noted that the embodiment does not limit the specific structure of the driving motor, but only needs to realize, through a certain control strategy, that the driving motor can control the sounding part and the function module of the electronic device respectively according to different control signals.

Preferably, the electronic device may further include a packaging structure arranged outside the driving motor. The driving motor and the packaging structure can form the vibration module. The driving motor in the first vibration mode can cooperate with the sounding part of the packaging structure, and can drive the sounding part to generate a vibrating sound wave; and the driving motor in the second vibrating mode can cooperate with at least one function module of the electronic device body, and can drive the function module to vibrate.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In some embodiments, the present disclosure further provides a non-transitory computer-readable storage medium including instructions, for example, a memory including instructions. The instructions, when executed by a processor of the electronic device, may implement the control method of the present disclosure. For example, the non-transitory computer-readable storage medium may be a Read-Only Memory (ROM), a Random-Access Memory (RAM), a Compact Disc Read-Only Memory (CD-ROM), a magnetic tape, a floppy disc, an optical data storage device and the like.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A vibration module, assembled inside a device body of an electronic device, the vibration module comprising: piezoceramics, a driving motor and a packaging structure arranged outside the driving motor; wherein
 the driving motor is configured to be electrically connected with a control chip of the electronic device and controlled to be in a first vibration mode or a second vibration mode;
 the packaging structure comprises a sounding part;
 when the driving motor is in the first vibration mode, the driving motor is configured to cooperate with the sounding part and drive the sounding part to generate a vibrating sound wave;

when the driving motor is in the second vibration mode, the driving motor is configured to cooperate with at least one function module of the device body and drive the at least one function module to vibrate;

the piezoceramics is configured to be electrically connected with the control chip and cooperate with the sounding part, so as to be controlled to drive the sounding part to generate the vibrating sound wave.

2. The vibration module according to claim 1, wherein the driving motor is a linear motor.

3. The vibration module according to claim 1, wherein the driving motor is configured to adopt a first vibration parameter when the driving motor is in the first vibration mode, and adopt a second vibration parameter when the driving motor is in the second vibration mode, the first vibration parameter being different from the second vibration parameter.

4. The vibration module according to claim 1, further comprising a driving medium, wherein the driving medium is configured to be respectively connected with the driving motor and the sounding part.

5. The vibration module according to claim 4, wherein the driving medium is a linkage mechanism.

6. The vibration module according to claim 1, wherein materials of the sounding part comprise ceramic.

7. The vibration module according to claim 1, wherein the function module comprises at least one of a screen, a function key, and a casing.

8. An electronic device, comprising: a device body, a control chip and a vibration module which are assembled inside the device body, wherein the vibration module comprises: piezoceramics, a driving motor and a packaging structure arranged outside the driving motor; wherein the driving motor is configured to be electrically connected with the control chip and controlled to be in a first vibration mode or a second vibration mode;

the packaging structure comprises a sounding part;

when the driving motor is in the first vibration mode, the driving motor is configured to cooperate with the sounding part and drive the sounding part to generate a vibrating sound wave;

when the driving motor is in the second vibration mode, the driving motor is configured to cooperate with at least one function module of the device body and drive the at least one function module to vibrate;

the piezoceramics is configured to be electrically connected with the control chip and cooperate with the sounding part, so as to be controlled to drive the sounding part to generate the vibrating sound wave.

9. The electronic device of claim 8, wherein the control chip is configured to be electrically connected with the driving motor to send a sounding control signal or an interaction control signal to the driving motor.

10. The electronic device of claim 9, wherein the driving motor is configured to: upon receiving the sounding control signal, activate the first vibration mode; and upon receiving the interaction control signal, activate the second vibration mode.

11. The electronic device according to claim 8, wherein
a voltage exchange frequency of the interaction control signal is greater than a voltage exchange frequency of the sounding control signal; and/or,
a current of the interaction control signal is greater than a current of the sounding control signal.

12. The electronic device according to claim 8, wherein the driving motor is a linear motor.

13. The electronic device according to claim 8, wherein the driving motor is configured to adopt a first vibration parameter when the driving motor is in the first vibration mode, and adopt a second vibration parameter when the driving motor is in the second vibration mode, the first vibration parameter being different from the second vibration parameter.

14. The electronic device according to claim 8, further comprising a driving medium, wherein the driving medium is configured to be respectively connected with the driving motor and the sounding part.

15. The electronic device according to claim 8, wherein the driving medium is a linkage mechanism.

16. The electronic device according to claim 8, wherein materials of the sounding part comprise ceramic; and
the function module comprises at least one of a screen, a function key, and a casing.

17. A method of controlling an electronic device, the electronic device comprising a driving motor, a control chip and piezoceramics; the method comprising:

receiving a control signal;

when the control signal is a sounding control signal, controlling the driving motor to enter a first vibration mode, so as to enable the driving motor to drive a sounding part of the electronic device to generate a vibrating sound wave;

when the control signal is an interaction control signal, controlling the driving motor to enter a second vibration mode, so as to enable the driving motor to drive a function module of the electronic device to vibrate;

wherein the piezoceramics is configured to be electrically connected with the control chip and cooperate with the sounding part, so as to be controlled to drive the sounding part to generate the vibrating sound wave;

wherein the sounding part is a part of a packaging structure of a vibration module, the vibration module further comprises the piezoceramics and the driving motor, and the packaging structure is arranged outside the driving motor; and wherein the electronic device further comprises a device body, the control chip and the vibration module are assembled inside the device body.

18. A mobile terminal comprising the vibration module according to claim 1, wherein the mobile terminal has only one driving motor configured to implement both sounding control and vibration control of the mobile terminal, thereby facilitating reducing size and cost of the mobile terminal.

* * * * *